F. CONRAD.
WATTMETER.
APPLICATION FILED JUNE 21, 1912.

1,067,311.

Patented July 15, 1913.
2 SHEETS—SHEET 1.

WITNESSES:

INVENTOR
Frank Conrad
BY
ATTORNEY

F. CONRAD.
WATTMETER.
APPLICATION FILED JUNE 21, 1912.

1,067,311.

Patented July 15, 1913.

2 SHEETS—SHEET 2.

WITNESSES:

INVENTOR
Frank Conrad
BY
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

WATTMETER.

1,067,311.   Specification of Letters Patent.   Patented July 15, 1913.

Application filed June 21, 1912. Serial No. 705,036.

*To all whom it may concern:*

Be it known that I, FRANK CONRAD, a citizen of the United States, and a resident of Swissvale, in the county of Allegheny and State of Pennsylvania, have invented a new and useful Improvement in Wattmeters, of which the following is a specification.

My invention relates to electrical measuring instruments, such as wattmeters, and it has for its object to provide such an arrangement of the series coils of a wattmeter or similar instrument having high current-carrying capacity as to materially simplify and reduce the cost of the instrument and, at the same time, provide a higher degree of accuracy of operation than has heretofore been attainable in instruments of a similar character.

Figure 1:
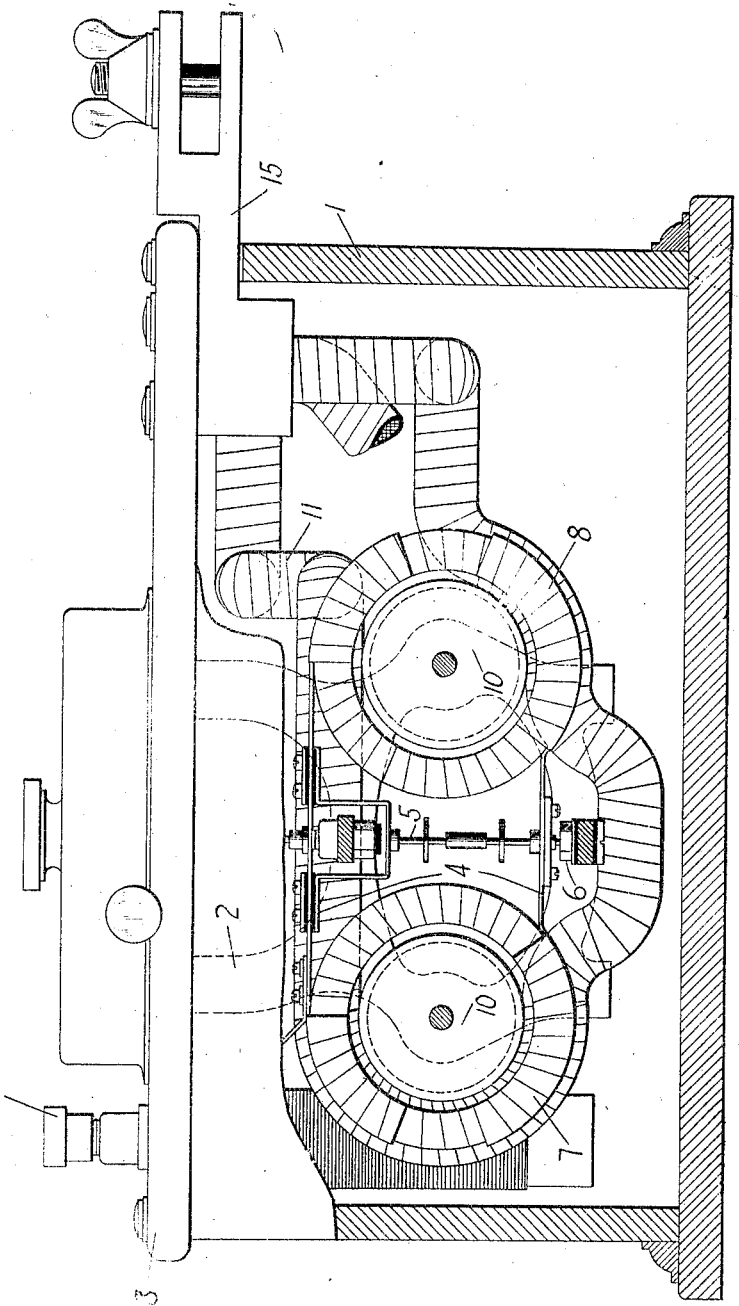
Figure 2:
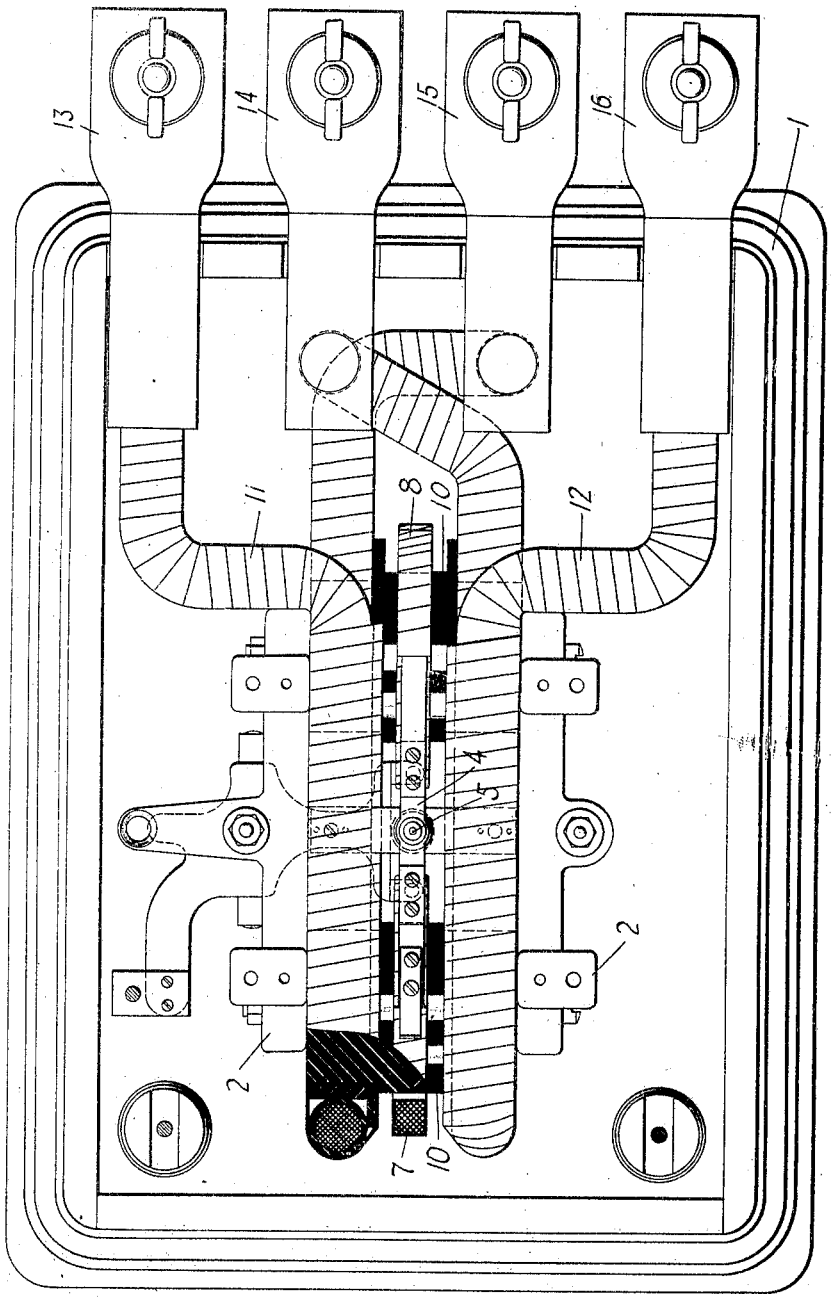

Figure 1 of the accompanying drawings is a side and sectional view of a wattmeter that is constructed in accordance with my invention, and Fig. 2 is a plan view of the wattmeter of Fig. 1, with its cover removed.

The operating parts of the instrument are inclosed within a box or casing 1 and are carried by brackets 2 that are secured to and depend from the lower face of the cover 3 of the box. The said operating parts comprise a pivotally mounted frame 4 that is carried by a shaft 5 for which bearings 6 are provided in the brackets 2. Taped, or otherwise suitably secured, to the ends of the frame 4 and located upon opposite sides of the shaft 5, are two potential coils 7 and 8, respectively, the terminals of which are connected to binding posts 9 upon the cover 3, the said potential coils being connected, in the usual manner, between the conductors of a circuit with respect to which the meter is adapted to make measurements.

The potential coils 7 and 8 loosely surround insulators 10 that are interposed between and secured to the brackets 2, the said insulators serving as supports for two load coils 11 and 12, respectively located upon opposite sides of the potential coils, and their ends being connected to terminal members 13, 14, 15 and 16 that are secured to the cover of the casing and extend through its side to the exterior to permit of connecting the said load coils in the circuit with respect to which the meter is adapted to make measurements.

Each of the load coils 11 and 12 comprises a single convolution of a cable consisting of twisted strands or conductors, cables being employed for this purpose, since they may be more readily shaped and applied in the instrument than rigid conductors having the same current-carrying capacities, and also because the twisting of their conductors or strands provides for a more uniform distribution of the currents throughout the bodies of the cables. Each of the load coils also extends opposite or adjacent to the faces of both the potential coils, thus providing a more compact and economical instrument than would be possible if a separate load coil were provided opposite to each face of each of the potential coils. Moreover, when cables having very high current-carrying capacities are employed in the construction of the load coils, as in the present instance, it is possible to obtain a better and more uniform distribution of the currents throughout the bodies of the cables, with the result that the instrument has a higher degree of accuracy than has heretofore been obtainable in instruments of similar character and capacity.

I claim as my invention:

1. A wattmeter comprising two potential coils mounted for movement about an axis located between them, and two load coils respectively adjacent to opposite sides of the potential coils, each load coil being opposite both potential coils.

2. A wattmeter comprising two potential coils mounted for movement about an axis located between them, and two load coils respectively adjacent to opposite sides of the potential coils, each load coil being opposite both potential coils, and consisting of a cable of twisted conductors.

3. A wattmeter comprising two potential coils mounted for movement about an axis located between them, and two load coils respectively adjacent to opposite sides of the potential coils, each load coil being opposite both potential coils and consisting of a single convolution of a cable of twisted conductors.

4. A meter comprising two pivotally mounted coils, and two stationary coils respectively adjacent to opposite sides of the pivotally mounted coils, each of the stationary coils being opposite both of the pivotally mounted coils.

5. A meter comprising two pivotally mounted coils located between substantially the same planes and two stationary coils respectively adjacent to opposite sides of the pivotally mounted coils, the convolutions of the stationary coils being of substantially twice the length of the convolutions of the pivotally mounted coils, and the faces of the stationary coils being opposite to the faces of both of the pivotally mounted coils.

6. A meter comprising two movable coils and two stationary coils respectively adjacent to opposite sides of the movable coils, each of the stationary coils being opposite both of the movable coils.

In testimony whereof, I have hereunto subscribed my name this 17th day of June, 1912.

FRANK CONRAD.

Witnesses:
 WM. M. BRADSHAW,
 B. B. HINES.